United States Patent
Seo et al.

(10) Patent No.: US 9,152,267 B2
(45) Date of Patent: Oct. 6, 2015

(54) DISPLAY DEVICE WITH TOUCH SCREEN

(71) Applicant: LG DISPLAY CO., LTD., Seoul (KR)

(72) Inventors: Sang-Woo Seo, Daegu (KR); Jung-Hwan Lee, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 11 days.

(21) Appl. No.: 14/143,111

(22) Filed: Dec. 30, 2013

(65) Prior Publication Data

US 2015/0035761 A1     Feb. 5, 2015

(30) Foreign Application Priority Data

Jul. 31, 2013    (KR) ........................ 10-2013-0090976

(51) Int. Cl.
G06F 3/041     (2006.01)
G06F 3/044     (2006.01)

(52) U.S. Cl.
CPC .............. G06F 3/0412 (2013.01); G06F 3/044 (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 2012/0019482 A1 | 1/2012 | Wang | |
| 2012/0075238 A1 | 3/2012 | Minami et al. | |
| 2013/0049771 A1* | 2/2013 | Peng et al. | 324/658 |
| 2013/0265257 A1* | 10/2013 | Jung et al. | 345/173 |
| 2013/0293096 A1 | 11/2013 | Kang et al. | |

FOREIGN PATENT DOCUMENTS

| | | |
|---|---|---|
| JP | 2009-026290 A | 2/2009 |
| JP | 2012-073783 A | 4/2012 |
| JP | 2013-025626 A | 2/2013 |
| KR | 20-2012-0004494 U | 6/2012 |
| KR | 10-2013-0124882 A | 11/2013 |
| TW | 200846990 A | 12/2008 |
| TW | 201205155 A1 | 2/2012 |
| TW | 201234244 A1 | 8/2012 |
| WO | WO 2011/142333 A1 | 11/2011 |

* cited by examiner

*Primary Examiner* — Joseph Haley
(74) *Attorney, Agent, or Firm* — Birch, Stewart, Kolasch & Birch, LLP

(57) ABSTRACT

A display device with a touch screen includes a panel including a first area and a second area, wherein first electrode strings and second electrode strings crossing the first electrode strings are formed in the first area and the second area; a driving controller applying touch driving signals to the first electrode strings in order; and a sensing controller receiving touch sensing signals according to the touch driving signals through the second electrode strings, wherein a distance between adjacent first electrode strings in the first area is different from a distance between adjacent first electrode strings in the second area, or a distance between adjacent second electrode strings in the first area is different from a distance between adjacent second electrode strings in the second area.

14 Claims, 6 Drawing Sheets

DISPLAY DEVICE WITH TOUCH SCREEN

The present application claims the priority benefit of Korean Patent Application No. 10-2013-0090976 filed in the Republic of Korea on Jul. 31, 2013, which is hereby incorporated by reference in their entirety.

BACKGROUND

1. Field of the Disclosure

The present disclosure relates to a display device, and more particularly, to a display device capable of sensing touch and a driving method of the same.

2. Discussion of the Related Art

A display device with a touch screen, generally, is a device in which a sensing device capable of detecting a contact location of a user is installed on a display device or integrated with the display device and buttons or images are displayed on a screen of the display device such that the user can directly input on the screen. Since the display device with a touch screen does not need an input device such as a keyboard, a mouse or a keypad, the display device with a touch screen has been widely used for various electronic devices with a portable information terminal and a display unit such as cellular phones in addition to personal computers.

Touch screens are classified into various types according to different methods of detecting a touch input of a user, including capacitive type, electromagnetic type, and optical type. Among these types, a capacitive type touch screen includes driving electrode strings and sensing electrode strings and senses change in capacitance between the driving electrode strings and the sensing electrode strings according to the touch input of the user to detect a location of the contact input.

Hereinafter, a related art capacitive type touch screen will be described with reference to FIG. 1 and FIG. 2.

FIG. 1 is a view of illustrating a display device with a touch screen according to the related art. FIG. 2 is a view of enlarging a region A of FIG. 1 and showing a touch input to the display device with a touch screen according to the related art.

In FIG. 1, the display device with a touch screen according to the related art includes a panel 10 in which a center area and an edge area are defined. First electrode strings 11 and second electrode strings 12 are formed in the center area and the edge area. The edge area is angularly bent. The first electrode strings 11 are arranged and are spaced apart from each other in a first direction. The second electrode strings 12 are arranged and are spaced apart from each other in a second direction crossing the first direction.

In FIG. 2, a space between adjacent first electrode strings 11 in the center area is equal to a space between adjacent first electrode strings 11 in the edge area, and a distance W1 between adjacent second electrode strings 12 in the center area is equal to a distance W2 between adjacent second electrode strings 12 in the edge area.

Here, the first electrode strings 11 are driving electrode strings to which touch driving signals are applied. The second electrode strings 12 are sensing electrode strings for sensing change in capacitance, which are generated between the first electrode strings 11 and the second electrode strings 12 by the touch driving signals applied to the first electrode strings 11, according to the touch input of a user.

However, in the display device with a touch screen according to the related art, crossing portions of the first electrode strings 11 and the second electrode strings 12 contacting a touch input of the user in the edge area are less than crossing portions of the first electrode strings 11 and the second electrode strings 12 contacting a touch input of the user in the center area.

For example, as shown in FIG. 2, the touch input in the center area contacts nine crossing portions of the first electrode strings 11 and the second electrode strings 12, while the touch input in the edge area contacts three crossing portions of the first electrode strings 11 and the second electrode strings 12.

Thus, in the capacitance generated between the first electrode strings 11 and the second electrode strings 12 by the touch driving signals, a sensing amount of the change of the capacitance in the edge area according to the touch input of the user is smaller than a sending amount of the change of the capacitance in the center area. Accordingly, touch sensitivity in the edge area is low as compared with touch sensitivity in the center area.

SUMMARY OF THE INVENTION

Accordingly, the present invention is directed to a display device with a touch screen, which substantially obviates one or more of the problems due to limitations and disadvantages of the related art.

An object of the present disclosure is to provide a display device with a touch screen that improves touch sensitivity in peripheries of a panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a display device with a touch screen includes a panel including a first area and a second area, wherein first electrode strings and second electrode strings crossing the first electrode strings are formed in the first area and the second area; a driving controller applying touch driving signals to the first electrode strings in order; and a sensing controller receiving touch sensing signals according to the touch driving signals through the second electrode strings, wherein a distance between adjacent first electrode strings in the first area is different from a distance between adjacent first electrode strings in the second area, or a distance between adjacent second electrode strings in the first area is different from a distance between adjacent second electrode strings in the second area.

In another aspect, a display device with a touch screen includes a panel including a first area and a second area, wherein first electrode strings and second electrode strings crossing the first electrode strings are formed in the first area and the second area; a driving controller applying touch driving signals to the first electrode strings in order; and a sensing controller receiving touch sensing signals according to the touch driving signals through the second electrode strings, wherein a distance between adjacent first electrode strings in the second area is narrower than a distance between adjacent first electrode strings in the first area, or a distance between adjacent second electrode strings in the second area is narrower than a distance between adjacent second electrode strings in the first area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Here, a liquid crystal display (LCD) device may be used for a panel of a display device with a touch screen according to the present invention, for example, and the present invention is not limited. Various flat panel display (FPD) devices such as a field emission display (FED) device, a plasma display panel (PDP) device, an electroluminescence (EL) device including an inorganic light emitting diode device or an organic light emitting diode (OLED) device, or an electrophoresis display (EPD) device may be used for the panel of the display device with a touch screen according to the present invention.

Figure 1:
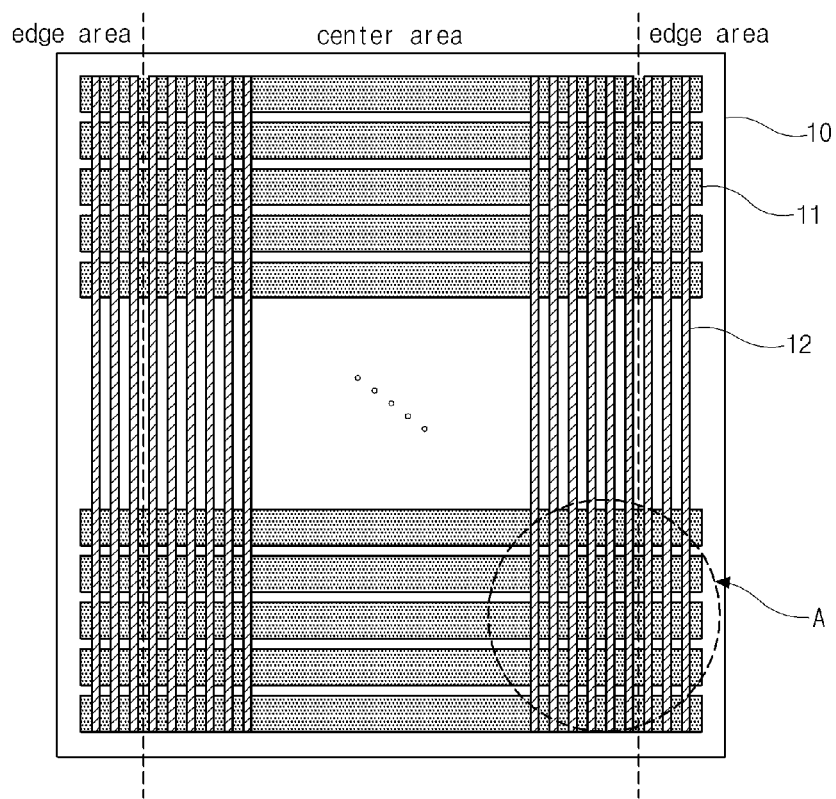
FIG. 1 is a view of illustrating a display device with a touch screen according to the related art.
Figure 2:
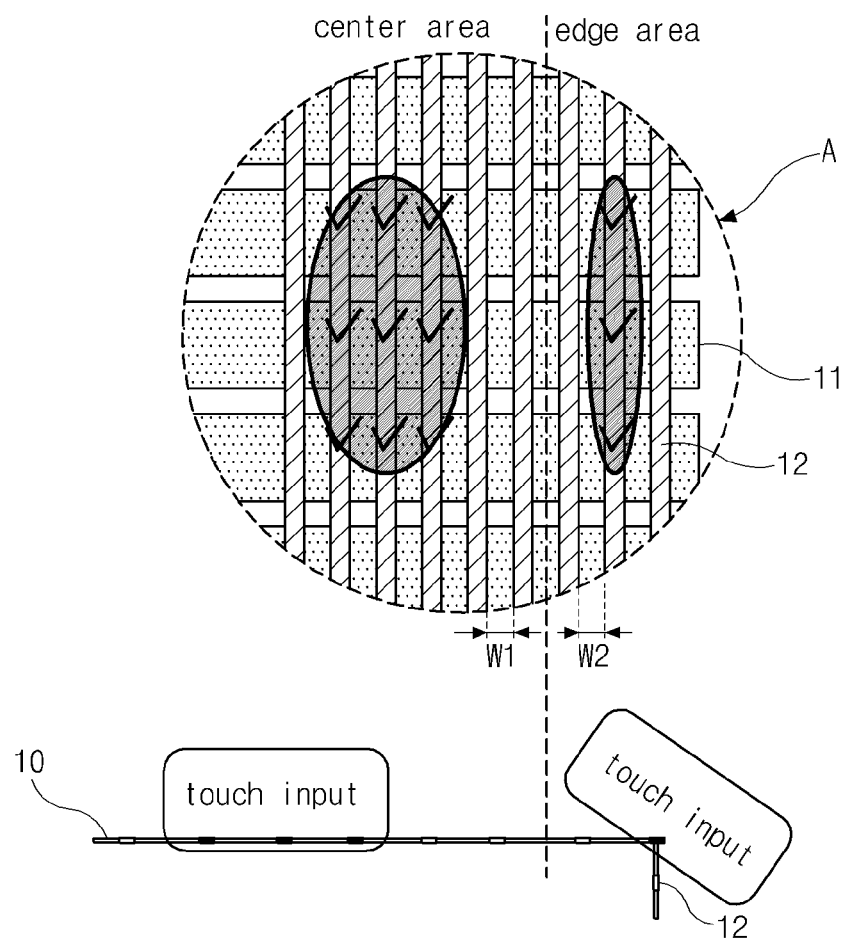
FIG. 2 is a view of enlarging a region A of FIG. 1 and showing a touch input to the display device with a touch screen according to the related art.
Figure 3:
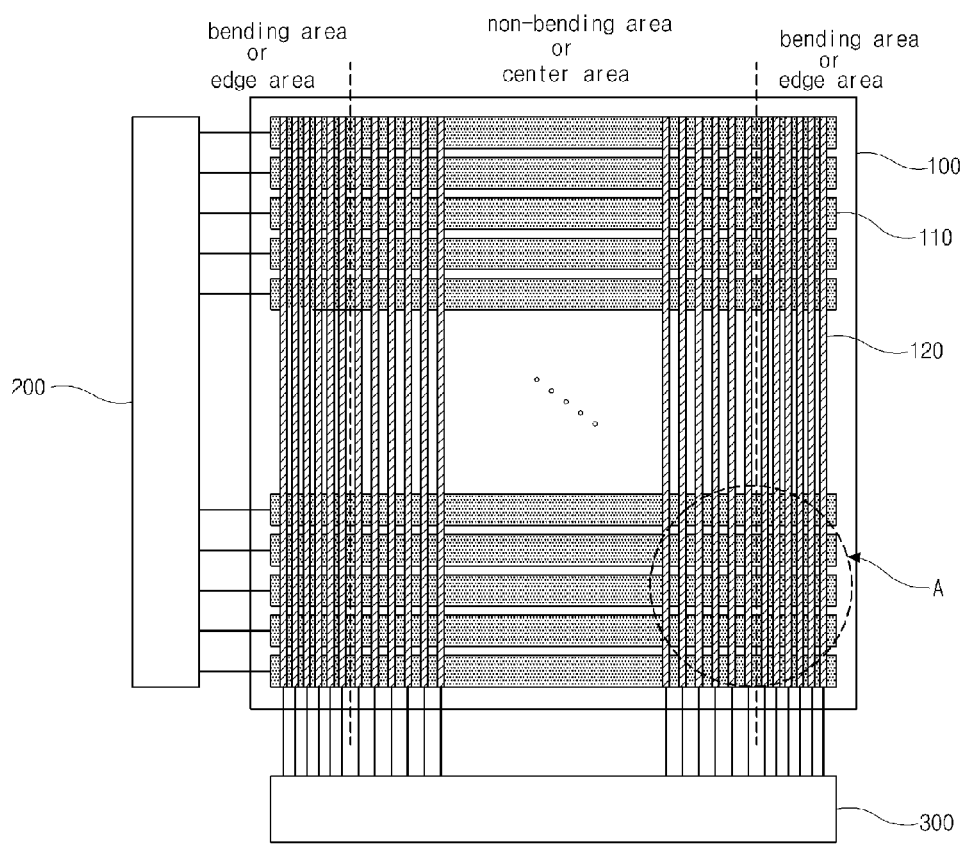
FIG. 3 is a view of illustrating a display device with a touch screen according to an embodiment of the present invention.

FIG. 3 is a view of illustrating a display device with a touch screen according to an embodiment of the present invention.

In FIG. 3, the display device with a touch screen according to the embodiment of the present invention includes a panel 100, a driving controller 200 and a sensing controller 300.

The panel 100 includes a first area and a second area. A plurality of first electrode strings 110 and a plurality of second electrode strings 120 crossing the plurality of first electrode strings 110 are formed in the first area and the second area.

The first area is a non-bending area in which the panel 100 is flat, and the second area is a bending area in which the panel 100 is curvedly bent. Alternatively, the first area is a center area in which the panel 100 is flat, and the second area is an edge area in which the panel 100 is angularly bent.

In FIG. 3, the bending area is disposed at each of both sides of the non-bending area of the panel 100, or the edge area is disposed at each of both sides of the center area of the panel 100. Such an arrangement and a shape of the bending area or the edge area are examples of the present invention, and the location and number of the bending area or the edge area are not limited.

Namely, a plurality of bending areas or a plurality of edge areas may be formed in the panel 110, and the bending area or the edge area may be formed anywhere in the panel 110.

The panel including the non-bending area and the bending area will be described in detail with reference to FIG. 4, and the panel including the center area and the edge area will be described in detail with reference to FIG. 5.

The first electrode strings 110 are arranged and spaced apart from each other along a first direction, and the second electrode strings 120 are arranged and spaced apart from each other along a second direction crossing the first direction. As shown in FIG. 3, a distance between adjacent second electrode strings 110 in the second area, that is, the bending area or the edge area differs from a distance between adjacent second electrode strings 110 in the first area, that is, the non-bending area or the center area.

Here, the first electrode strings 110 and the second electrode strings 120 may be insulated from each other with a film or glass substrate therebetween, or only crossing portions of the first electrode strings 110 and the second electrode strings 120 may be insulated from each other. A film or glass substrate may be further formed under the first electrode strings 110 or the second electrode strings 120.

In addition, the first electrode strings 110 and the second electrode strings 120 each may be illustrated as a straight line, which may be composed of rectangular electrodes connected to each other in a direction, but are not limited thereto. For example, the electrodes of the first electrode strings 110 and the second electrode strings 120 may be formed in various shapes such as a tetragon, a pentagon, a hexagon, and a circle, and thus, the first electrode strings 110 and the second electrode strings 120 may have a shape other than a straight line.

The driving controller 200 applies touch driving signals to the first electrode strings 110 of the panel 100 in order.

That is to say, the driving controller 200 applies the touch driving signals for detecting touches to the first electrode strings 110 of the panel 100 in order such that capacitance is generated between the first electrode strings 110 and the second electrode strings 120.

Next, the sensing controller 300 receives touch sensing signals according to the touch driving signals through the second electrode strings 120 to confirm a touch input location of the user.

Namely, the capacitance is generated by the touch driving signals between the first electrode strings 110 and the second electrode strings 120, the capacitance between the first electrode strings 110 and the second electrode strings 120 is changed according to a finger touch, and the sensing controller 300 receives the touch sensing signals about the change in the capacitance through the second electrode strings 120 to confirm the touch input location of the user.

Here, receiving the touch sensing signals includes receiving the change in the capacitance between the first electrode string 110 of a first line and the second electrode strings 120 according to the touch driving signal applied to the first electrode string 110 of the first line through all the second electrode strings 120 in order and receiving the change in the capacitance between the first electrode string 110 of a second line and the second electrode strings 120 according to the touch driving signal applied to the first electrode string 110 of the second line through all the second electrode strings 120 in order. Receiving the touch sensing signals further includes receiving the change in the capacitance between other first electrode strings 110 and the second electrode strings 120 according to the touch driving signal applied to other first electrode strings 110 through all the second electrode strings 120 in order until the change in the capacitance between the first electrode string 110 of a last line and the second electrode strings 120 is received through all the second electrode strings 120.

Hereinafter, a touch input to a display device with a touch screen having different arrangements of electrodes in areas of a panel according to an embodiment of the present invention will be described in detail with reference to FIG. 4. Additionally, the first electrode strings and the second electrode strings of the panel and the first area and the second area of the panel will be described in detail.

Figure 4:
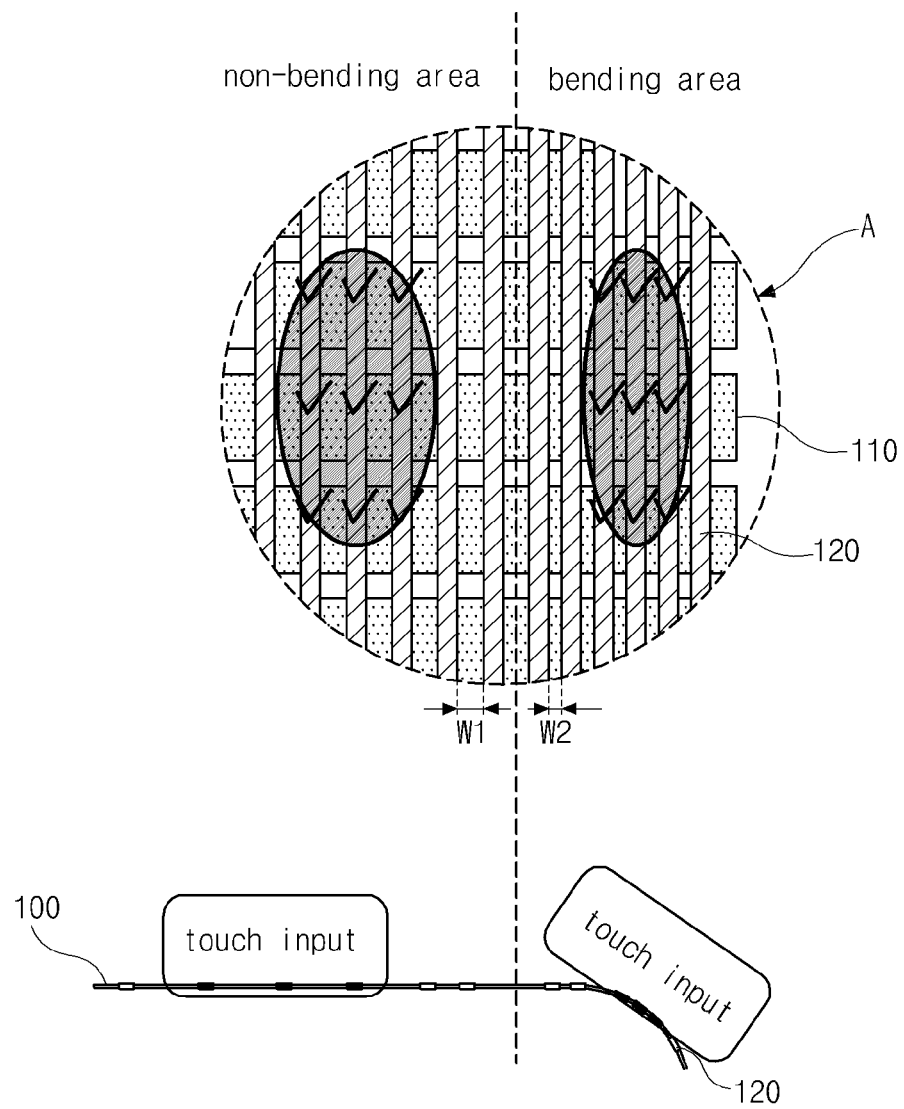
FIG. 4 is a view of enlarging a region A of FIG. 3 and illustrating a touch input to the display device with a touch screen including a panel which is divided into a non-bending area and a bending area.

FIG. 4 is a view of enlarging a region A of FIG. 3 and illustrating a touch input to the display device with a touch screen according to the embodiment of the present invention. Particularly, FIG. 4 shows a touch input to a panel which is divided into a non-bending area and a bending area.

In the embodiment of the present invention, the first area is the non-bending area in which the panel is flat, and the second area is the bending area in which the panel is curvedly bent. Images are displayed in the first area and the second area.

That is to say, the first area may be an area of a general flat panel in which an image is displayed. The second area may be a bent or curved area of a flexible panel in which an image is displayed.

The first electrode strings 110 and the second electrode strings 120 are formed in both the first area and the second area of the panel. Namely, driving electrode strings and sensing electrode strings are formed all over the non-bending area and the bending area of the panel.

In the embodiment of the present invention, a distance between adjacent second electrode strings in the second area, i.e., the bending area is different from a distance between adjacent second electrode strings in the first area, i.e., the non-bending area.

Particularly, as shown in FIG. 4, the distance W2 between adjacent second electrode strings 120 in the second area, i.e., the bending area is narrower than the distance W1 between adjacent second electrode strings 120 in the first area, i.e., the non-bending area.

Here, distances between adjacent second electrode strings may gradually become narrow from the first area to the second area.

By forming the second electrode strings closely in the bending area of the panel, crossing portions of the first electrode strings and the second electrode strings contacting or overlapping an input of the user in the bending area of the panel increase to the extent of crossing portions of the first electrode strings and the second electrode strings contacting or overlapping an input of the user in the non-bending area. Thus, the touch sensitivity in the bending area becomes similar to the touch sensitivity in the non-bending area.

For example, referring to FIG. 4, the touch input in the non-bending area contacts nine crossing portions of the first electrode strings and the second electrode strings, and the touch input in the bending area also contacts nine crossing portions of the first electrode strings and the second electrode strings by forming the second electrode strings closely in the bending area. The number of the crossing portions contacting the touch input in the bending area is not limited to the example. The distance between adjacent second electrode strings may be adjusted such that the number of the crossing portions contacting the touch input in the bending area is more than the number of the crossing portions contacting the touch input in the non-bending area.

Accordingly, in the capacitance generated between the first electrode strings 110 and the second electrode strings 120 by the touch driving signals, a sensing amount of the change of the capacitance in the bending area according to the touch input of the user is similar to a sensing amount of the change of the capacitance in the non-bending area. Accordingly, the touch sensitivity in the bending area is maintained similarly to or more than the touch sensitivity in the non-bending area.

Hereinafter, a touch input to a display device with a touch screen having different arrangements of electrodes in areas of a panel according to an embodiment of the present invention will be described in detail with reference to FIG. 5. Additionally, the first electrode strings and the second electrode strings of the panel and the first area and the second area of the panel will be described in detail.

Figure 5:
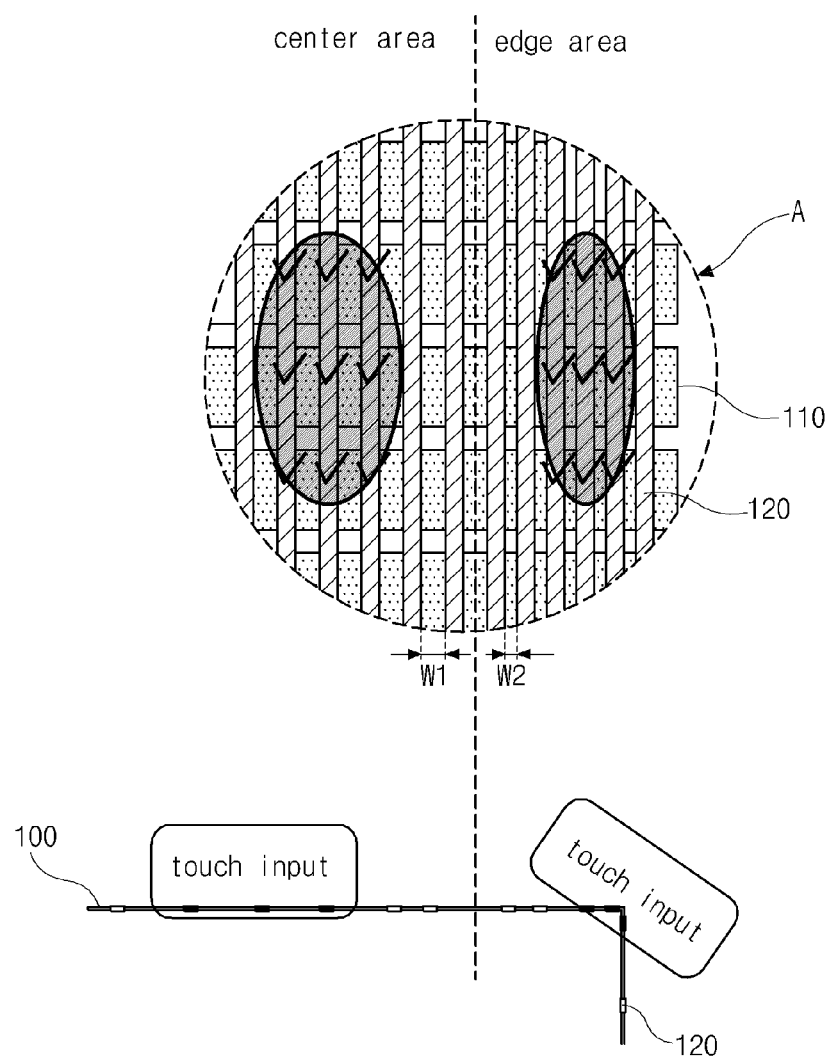
FIG. 5 is a view of enlarging a region A of FIG. 3 and illustrating a touch input to the display device with a touch screen including a panel which is divided into a center area and an edge area.

FIG. 5 is a view of enlarging a region A of FIG. 3 and illustrating a touch input to the display device with a touch screen according to the embodiment of the present invention. Particularly, FIG. 5 shows a touch input to a panel which is divided into a center area and an edge area.

In the embodiment of the present invention, the first area is the center area in which the panel is flat, and the second area is the bending area in which the panel is angularly bent and includes an angular part. Images are displayed in the first area and the second area. Here, the angular part may be an edge part.

That is to say, the first area may be an area of a general flat panel in which an image is displayed. The second area may be an area of a flexible panel which includes the angular part folded like a folder and in which an image is displayed.

The angular part may be a right-angle part, an acute-angle part or an obtuse-angle part.

The first electrode strings 110 and the second electrode strings 120 are formed in both the first area and the second area of the panel. Namely, driving electrode strings and sensing electrode strings are formed all over the center area and the edge area of the panel.

Here, in the second area, at least two first electrode strings 110 may be formed at each of both sides of the angular part, or at least two second electrode strings 120 may be formed at each of both sides of the angular part. That is, more than two first electrode strings or second electrode strings may be formed at each of both sides of the edge part of the edge area.

In the embodiment of the present invention, a distance between adjacent second electrode strings in the second area, i.e., the edge area is different from a distance between adjacent second electrode strings in the first area, i.e., the center area.

Particularly, the distance W2 between adjacent second electrode strings 120 in the second area, i.e., the edge area is narrower than the distance W1 between adjacent second electrode strings 120 in the first area, i.e., the center area.

Here, distances between adjacent second electrode strings may gradually become narrow from the first area to the second area.

By forming the second electrode strings closely in the edge area of the panel, crossing portions of the first electrode strings and the second electrode strings contacting or overlapping an input of the user in the edge area of the panel increase to the extent of crossing portions of the first electrode strings and the second electrode strings contacting or overlapping an input of the user in the center area. Thus, the touch sensitivity in the edge area becomes similar to the touch sensitivity in the center area.

For example, referring to FIG. 5, the touch input in the center area contacts nine crossing portions of the first electrode strings and the second electrode strings, and the touch input in the edge area also contacts nine crossing portions of the first electrode strings and the second electrode strings by forming the second electrode strings closely in the edge area. The number of the crossing portions contacting the touch input in the bending area is not limited to the example. The distance between adjacent second electrode strings may be adjusted such that the number of the crossing portions contacting the touch input in the edge area is more than the number of the crossing portions contacting the touch input in the center area.

Accordingly, in the capacitance generated between the first electrode strings 110 and the second electrode strings 120 by the touch driving signals, a sensing amount of the change of the capacitance in the edge area according to the touch input of the user is similar to a sensing amount of the change of the capacitance in the center area. Accordingly, the touch sensitivity in the edge area is maintained similarly to or more than the touch sensitivity in the center area.

A display device with a touch screen according to another embodiment of the present invention will be described hereinafter with reference to FIG. 6.

Figure 6:
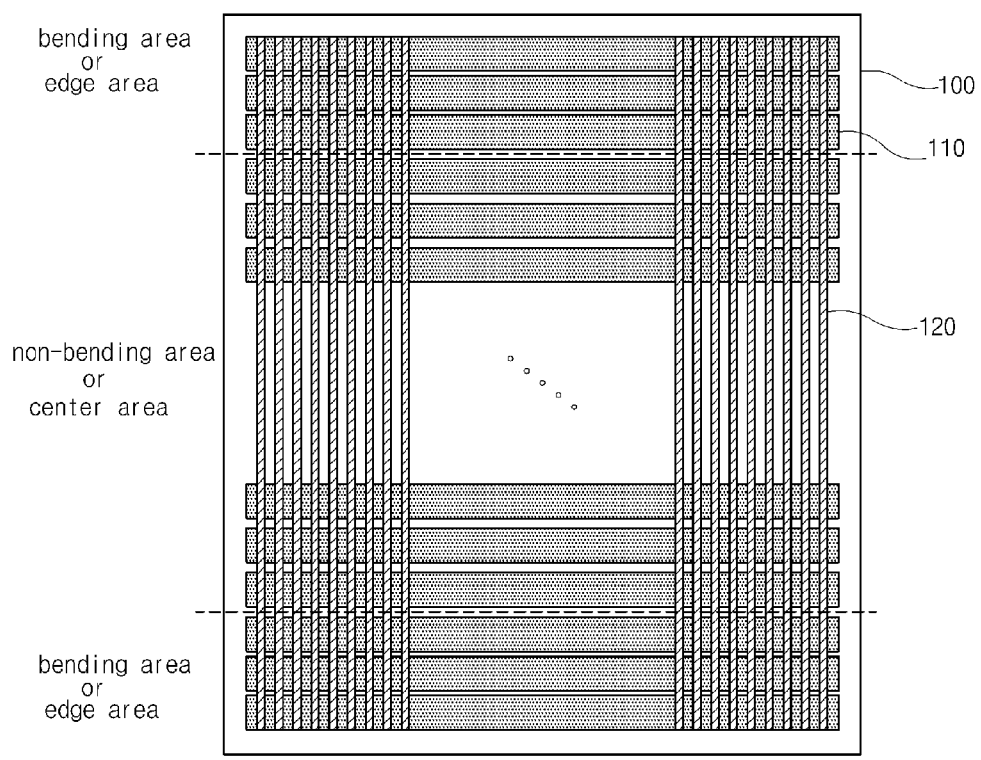
FIG. 6 is a view of illustrating a display device with a touch screen according to another embodiment of the present invention.

FIG. 6 is a view of illustrating a display device with a touch screen according to another embodiment of the present invention. FIG. 6 shows a structure of a display device in which a distance between first electrode strings in a bending area as a second area is narrower than a distance between first electrode strings in a non-bending area as a first area and a structure that a distance between first electrode strings in an edge area as a second area is narrower than a distance between first electrode strings in a center area as a first area.

In FIG. 6, the distance between adjacent first electrode strings in the second area, i.e., the bending area is different from the distance between adjacent first electrode strings in the first area, i.e., the non-bending area.

More particularly, the distance between adjacent first electrode strings in the second area, i.e., the bending area is narrower than the distance between adjacent first electrode strings in the first area, i.e., the non-bending area.

Here, distances between adjacent first electrode strings may gradually become narrow from the first area to the second area.

Alternatively, the distance between adjacent first electrode strings in the second area, i.e., the edge area is different from the distance between adjacent first electrode strings in the first area, i.e., the center area.

More particularly, the distance between adjacent first electrode strings in the second area, i.e., the edge area is narrower than the distance between adjacent first electrode strings in the first area, i.e., the center area.

Here, distances between adjacent first electrode strings may gradually become narrow from the first area to the second area.

That is to say, the first electrode strings in the bending area or the edge area of the panel are formed to have a narrower distance therebetween than the first electrode strings in the non-bending area or the center area. Crossing portions of the first electrode strings and the second electrode strings contacting or overlapping an input of the user in the bending area or the edge area of the panel increase to the extent of crossing portions of the first electrode strings and the second electrode strings contacting or overlapping an input of the user in the non-bending area or the center area of the panel. Thus, the touch sensitivity in the bending area or the edge area is improved.

Accordingly, in the capacitance generated between the first electrode strings and the second electrode strings by the touch driving signals, a sensing amount of the change of the capacitance in the bending area or the edge area according to the touch input of the user is similar to a sensing amount of the change of the capacitance in the non-bending area or the center area. Accordingly, the touch sensitivity in the bending area or the edge area is maintained similarly to or more than the touch sensitivity in the non-bending area or the center area.

In the embodiments of the present invention, errors of the touch input in the bending area or the edge area are supplemented, and the touch sensitivity in the in the bending area or the edge area is increased to the extent of the touch sensitivity in the non-bending area or the center area.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A display device with a touch screen, comprising:
    a panel including a first area and a second area, wherein first electrode strings and second electrode strings crossing the first electrode strings are formed in the first area and the second area;
    a driving controller applying touch driving signals to the first electrode strings in order; and
    a sensing controller receiving touch sensing signals according to the touch driving signals through the second electrode strings,
    wherein the first electrode strings in the first area have substantially a same first distance therebetween, and the first electrode strings in the second area have substantially a same second distance therebetween,
    wherein the second electrode strings in the first area have substantially a same third distance therebetween, and the second electrode strings in the second area have substantially a same fourth distance therebetween, and
    wherein the first distance between adjacent first electrode strings in the first area is different from the second distance between adjacent first electrode strings in the second area, or the third distance between adjacent second electrode strings in the first area is different from the fourth distance between adjacent second electrode strings in the second area.

2. The device according to claim 1, wherein the first area is a non-bending area in which the panel is flat and the second area is a bending area in which the panel is curvedly bent.

3. The device according to claim 1, wherein images are displayed in the first area and the second area.

4. The device according to claim 1, wherein the second distance between adjacent first electrode strings in the second area is narrower than the first distance between adjacent first electrode strings in the first area.

5. The device according to claim 1, wherein the fourth distance between adjacent second electrode strings in the second area is narrower than the third distance between adjacent second electrode strings in the first area.

6. The device according to claim 1, wherein the first electrode strings are driving electrode strings and the second electrode strings are sensing electrode strings.

7. A display device with a touch screen, comprising:
    a panel including a first area and a second area, wherein first electrode strings and second electrode strings crossing the first electrode strings are formed in the first area and the second area;
    a driving controller applying touch driving signals to the first electrode strings in order; and
    a sensing controller receiving touch sensing signals according to the touch driving signals through the second electrode strings, wherein the first electrode strings in the first area have substantially a same first distance therebetween, and the first electrode strings in the second area have substantially a same second distance therebetween, wherein the second electrode strings in the first area have substantially a same third distance therebetween, and the second electrode strings in the second area have substantially a same fourth distance therebetween, and wherein the second distance between adjacent first electrode strings in the second area is narrower than the first distance between adjacent first electrode strings in the first area, or the fourth distance between adjacent second electrode strings in the second area is narrower than the third distance between adjacent second electrode strings in the first area.

8. The device according to claim 7, wherein images are displayed in the first area and the second area.

9. The device according to claim 7, wherein the first area is a center area in which the panel is flat and the second area is an edge area in which the panel includes an angular part.

10. The device according to claim 9, wherein the angular part is an acute-angle part.

11. The device according to claim 9, wherein the angular part is an obtuse-angle part.

12. The device according to claim 9, wherein the angular part is a right-angle part.

13. The device according to claim 9, wherein at least two second electrode strings are formed at each of both sides of the angular part in the second area.

14. The device according to claim 7, wherein the first electrode strings are driving electrode strings and the second electrode strings are sensing electrode strings.

* * * * *